(12) United States Patent
Lekner et al.

(10) Patent No.: US 11,207,647 B2
(45) Date of Patent: Dec. 28, 2021

(54) ROTARY SHAFT FOR PROCESSING FOODSTUFFS, INDUSTRIAL DEVICE COMPRISING SUCH A ROTARY SHAFT, A METHOD OF MANUFACTURING SUCH A ROTARY SHAFT AND A METHOD FOR PROCESSING FOODSTUFFS

(71) Applicant: INNOLEK BEHEER B.V. [NL/NL], Eijsden (NL)

(72) Inventors: Geneviéve Maria Michaela Lekner, Eijsden (NL); Julian Wilhelmus Maria Lekner, Eijsden (NL); Gillis Anne Maria Victor Lekner, Eijsden (NL)

(73) Assignee: INNOLEK BEHEER B.V., Eijsden (NL)

( * ) Notice: Subject to any disclaimer, the term of this patent is extended or adjusted under 35 U.S.C. 154(b) by 533 days.

(21) Appl. No.: 16/303,205

(22) PCT Filed: May 23, 2017

(86) PCT No.: PCT/NL2017/050327
§ 371 (c)(1),
(2) Date: Nov. 20, 2018

(87) PCT Pub. No.: WO2017/204633
PCT Pub. Date: Nov. 30, 2017

(65) Prior Publication Data
US 2019/0201857 A1 Jul. 4, 2019

(30) Foreign Application Priority Data
May 24, 2016 (NL) ...................................... 2016816

(51) Int. Cl.
*B01F 15/06* (2006.01)
*B01F 7/00* (2006.01)
(Continued)

(52) U.S. Cl.
CPC ............ *B01F 15/068* (2013.01); *A21C 1/065* (2013.01); *A21C 1/1495* (2013.01); *A23G 1/125* (2013.01);
(Continued)

(58) Field of Classification Search
CPC .... B01F 15/068; B01F 7/00116; A23G 1/125; A23G 9/224; A21C 1/1495
See application file for complete search history.

(56) References Cited

U.S. PATENT DOCUMENTS 1,978,490 A 10/1934 Eggert
3,263,748 A * 8/1966 Jemal ........................ F27B 1/08
165/87

(Continued)

FOREIGN PATENT DOCUMENTS

DE 2145900 B1 * 11/1972 .......... B01F 7/00175
DE 2145900 B1 11/1972
(Continued)

OTHER PUBLICATIONS

Translation of Stelzer, Erwin (DE 2145900), published Nov. 9, 1972. Translation retrieved May 2021 (Year: 1972).*
International Search Report for International Application No. PCT/NL2017/050327 dated Sep. 11, 2017.

*Primary Examiner* — Elizabeth Insler
(74) *Attorney, Agent, or Firm* — Suiter Swantz pc llo

(57) ABSTRACT

The invention relates to a rotary shaft for processing foodstuffs, the rotary shaft has a rotation axis and the rotary shaft comprises at least one tool which extends along the rotation axis. The tool has an airfoil profile such that the tool comprises a leading edge, a trailing edge, an upper surface and a lower surface. Further, the tool comprises at least one fluid channel between the mean camber line of the airfoil profile and the upper surface of the tool.

20 Claims, 10 Drawing Sheets

(51) Int. Cl.
*B01F 7/08* (2006.01)
*A21C 1/06* (2006.01)
*A21C 1/14* (2006.01)
*A23G 1/12* (2006.01)
*A23N 17/00* (2006.01)

(52) U.S. Cl.
CPC ........ *A23N 17/007* (2013.01); *B01F 7/00116* (2013.01); *B01F 7/00175* (2013.01); *B01F 7/00366* (2013.01); *B01F 7/00433* (2013.01); *B01F 7/082* (2013.01); *B01F 7/085* (2013.01); *B01F 2015/061* (2013.01); *B01F 2015/062* (2013.01); *B01F 2215/0011* (2013.01); *B01F 2215/0019* (2013.01)

(56) References Cited

U.S. PATENT DOCUMENTS 3,612,169 A * 10/1971 Matsuoka ............... B29B 7/186
                                                165/86
5,055,273 A * 10/1991 Wilhelm ................. B01F 7/048
                                                422/135

FOREIGN PATENT DOCUMENTS

| DE | 10 2006 050 586 A1 | 4/2008 |
| DE | 20 2009 013 097 U1 | 2/2011 |
| EP | 2679100 A1 | 1/2014 |
| JP | S56152731 A | 11/1981 |
| JP | 201259401 A | 9/2001 |

* cited by examiner

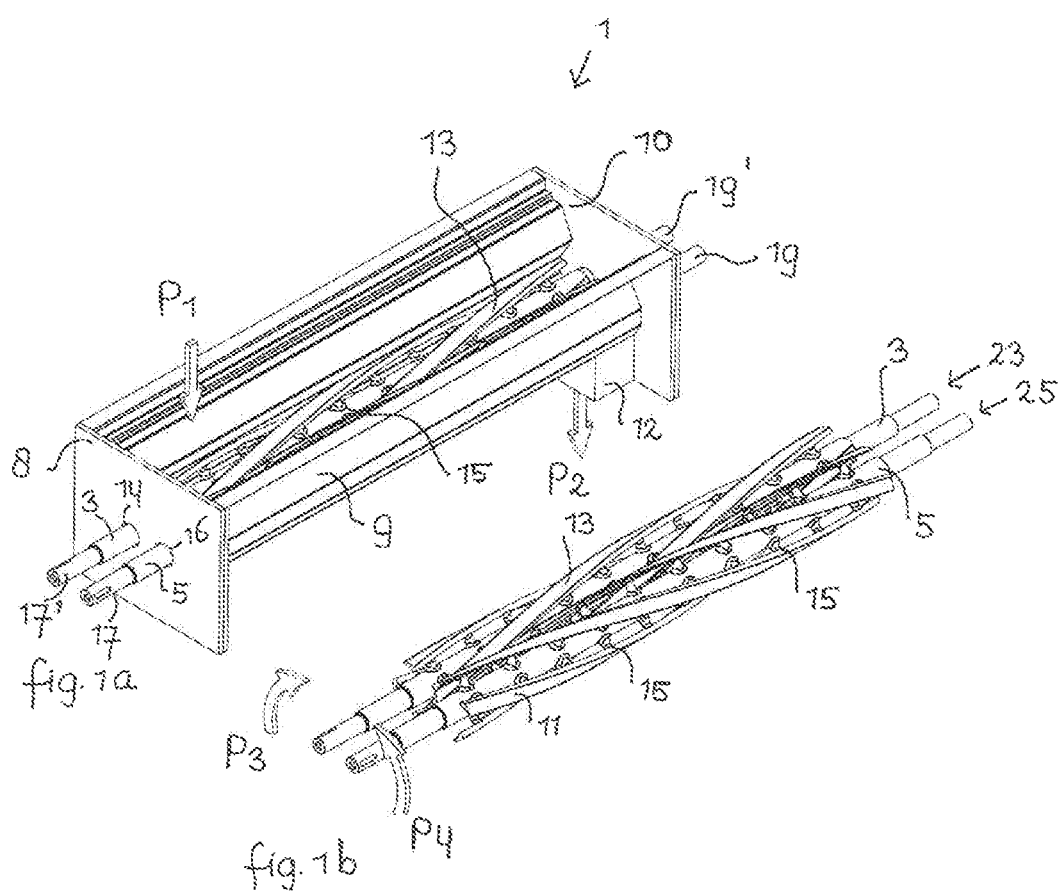

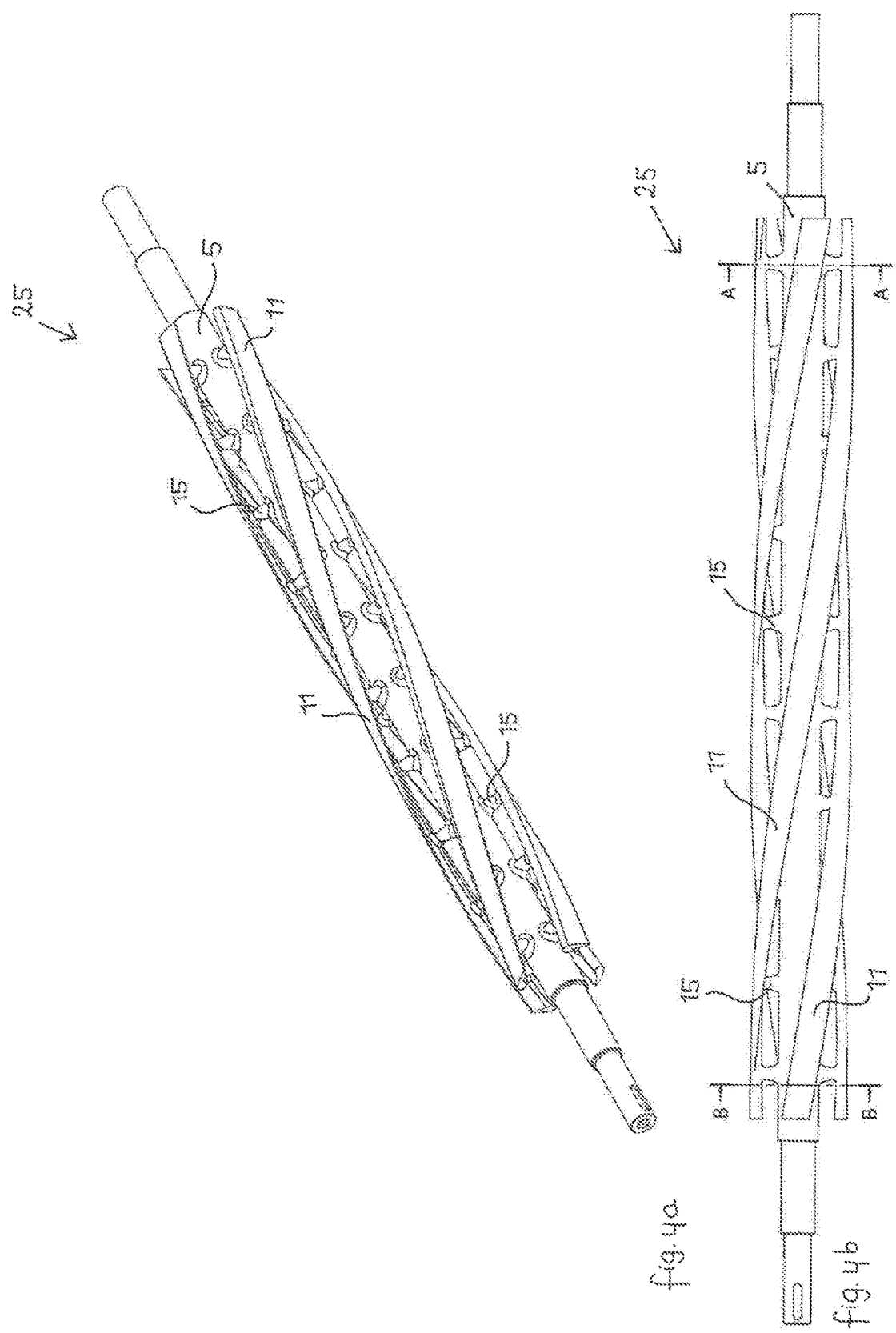

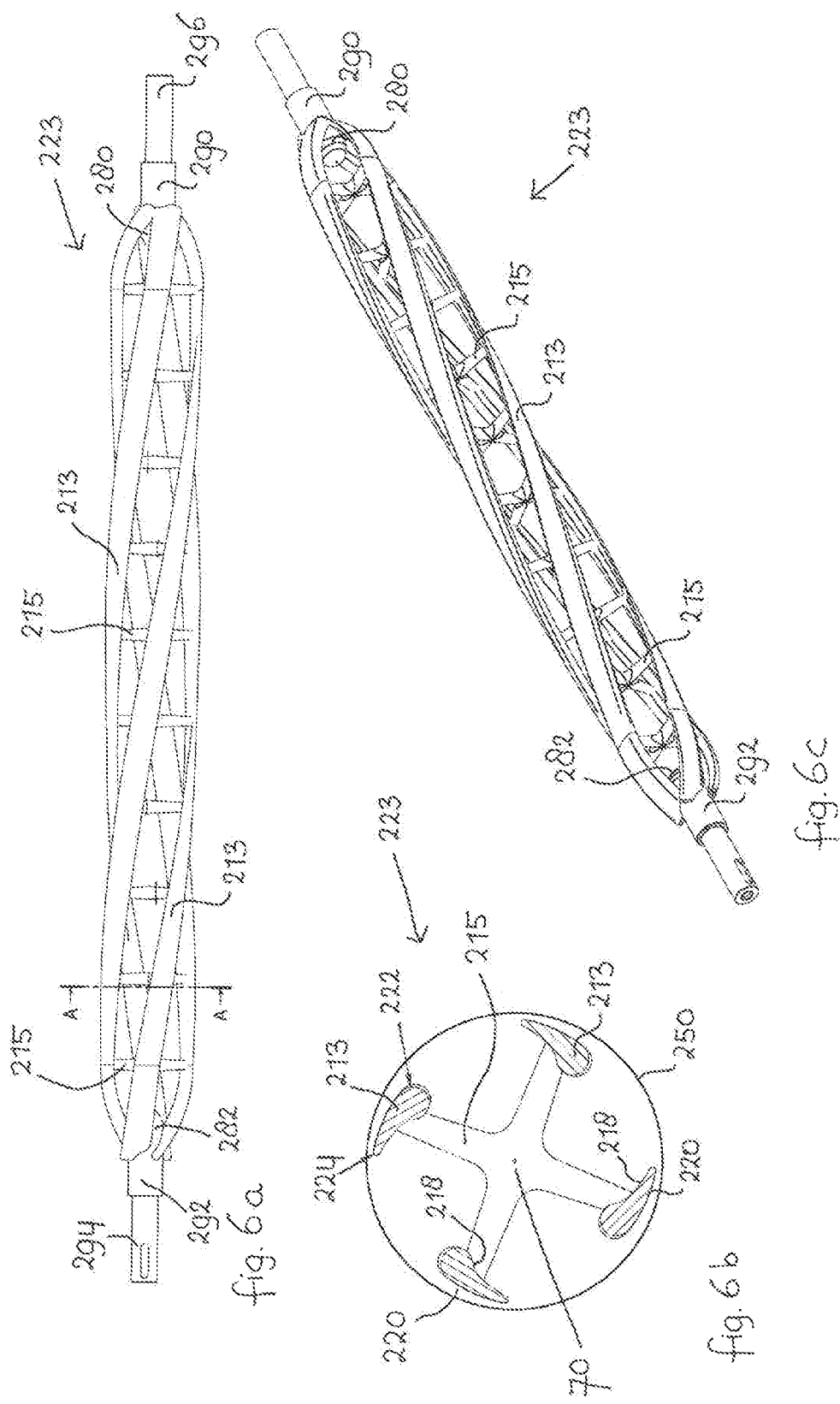

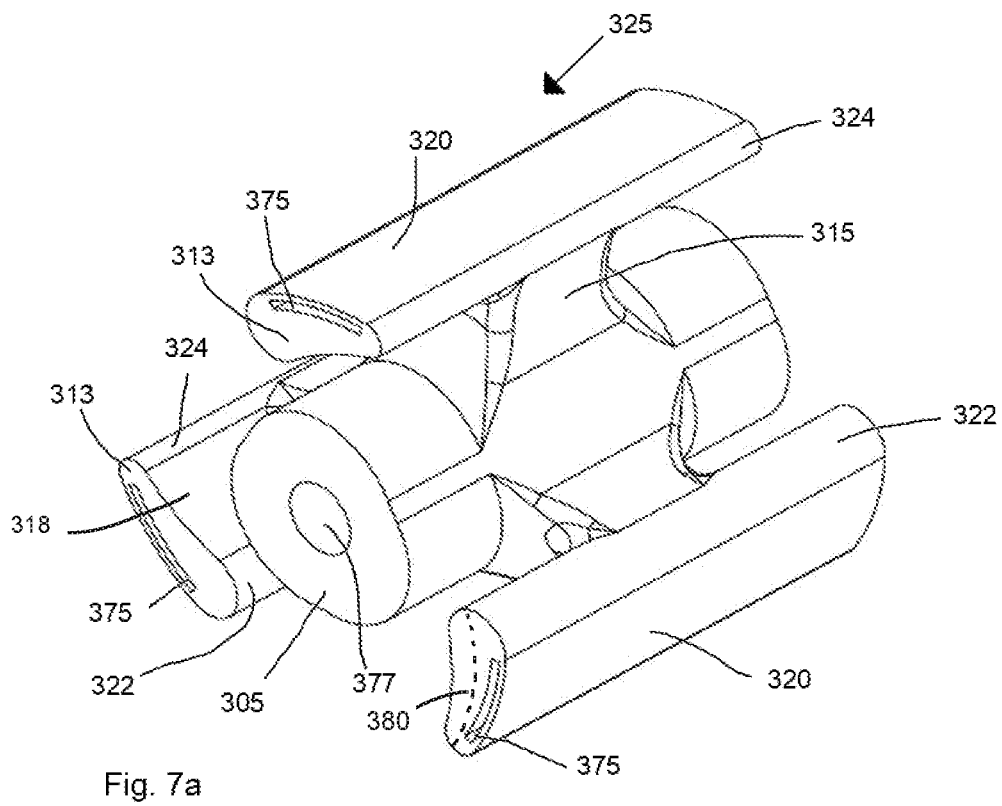
Fig. 7a
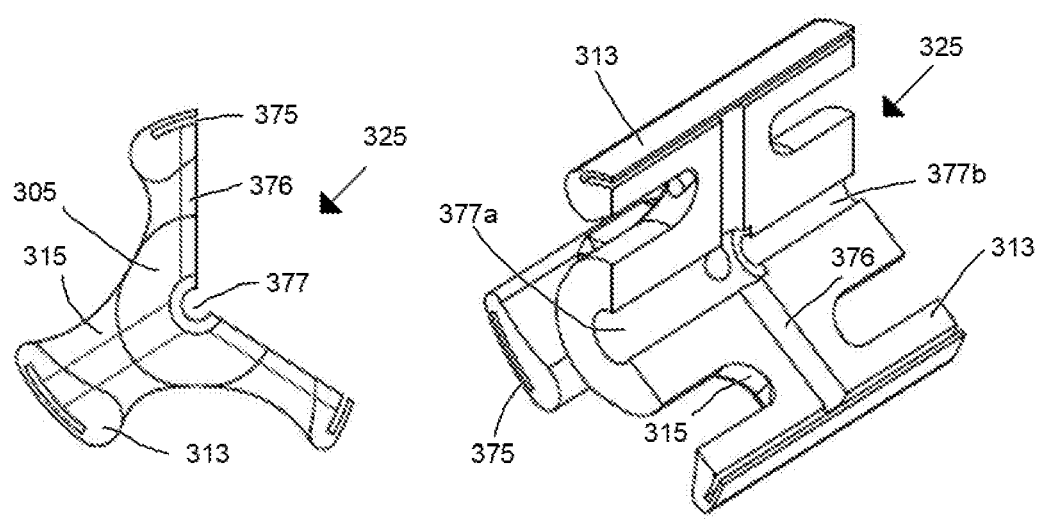
Fig. 7c
Fig. 7b

ROTARY SHAFT FOR PROCESSING FOODSTUFFS, INDUSTRIAL DEVICE COMPRISING SUCH A ROTARY SHAFT, A METHOD OF MANUFACTURING SUCH A ROTARY SHAFT AND A METHOD FOR PROCESSING FOODSTUFFS

TECHNICAL FIELD AND BACKGROUND

The invention relates to a rotary shaft for processing foodstuffs and a method of manufacturing such a rotary shaft. The invention also relates to an industrial device for processing foodstuffs and a method for processing foodstuffs using the industrial device.

An example of a rotary shaft, an industrial device and a method for mixing and/or kneading foodstuffs using the industrial device are generally known from WO2006/135229. In the known device the bar-shaped tool is connected to a central shaft part by a number of spacers.

BRIEF SUMMARY

It is a goal of the present invention to provide a rotary shaft having a tool designed for an improved and more energy efficient processing of food products, in particular mixing, kneading and/or conching foodstuffs.

This goal is achieved by a rotary shaft according to claim 1.

The rotary shaft for processing foodstuffs, in particular kneading and/or mixing and/or conching foodstuff, has a rotation axis. The (virtual) rotation axis extends in the longitudinal direction of the rotary shaft. The rotary shaft comprises at least one tool which extends along the rotation axis. The tool has an airfoil profile such that the tool comprises a leading edge, a trailing edge, an upper surface and a lower surface. Preferably, the leading edge and the trailing edge are different from each other, i.e. have a different shape to increase the shear stress in the foodstuff being processed by the rotary shaft. This tool of the rotary shaft allows improved mixing, kneading and/or conching of foodstuffs with considerably less power than most other types of known tools, i.e. the airfoil profile design of the tool contributes to a more energy efficient foodstuff processing.

The tool comprises at least one fluid channel extending in the length direction of the tool and the fluid channel is located between the virtual mean camber line of the airfoil profile and the upper surface of the tool. By means of the fluid channel located relatively close to the upper surface of the tool it is possible to control the temperature of the tool, in particular the temperature of the upper surface of the tool. The upper surface of the tool is a large contact surface with the foodstuff being processed. Hence, it is possible to control the temperature of the foodstuff being processed by means of the fluid channel mainly by controlling the temperature of a single contact surface with the food, i.e. the relatively large upper surface of the tool. Depending on the food and/or other circumstances, the fluid in the fluid channel in the tool may have a low temperature for cooling the foodstuff being processed or the fluid may have a high temperature for heating the foodstuff being processed.

Another advantage of the tool with the airfoil profile having a fluid channel is that in use of the rotary shaft in a container between an upper surface of the tool and the container wall the foodstuffs can be subjected to more shear stress, as a result of which the foodstuff such as for example dough will be better kneaded and for example chocolate will be better conched in particular in the pasty phase. Such relatively high shear stress requires normally much power required to turn the shafts, which power consumption is drastically decreased with the rotary shaft comprising the tool having an airfoil design. Further, these shear stresses may also produce heat in the food stuff being processed, in particular in the foodstuff between the container wall and the upper surface of the tool. This heat may have a negative effect on the quality of the foodstuff being processed. The fluid channel in the tool is able to cool the upper surface of the tool and so also the foodstuff being processed, in particular the foodstuffs between the container wall and the upper surface of the tool, i.e. the area where the relatively high shear stresses (producing the heat) occur. It is possible depending on the foodstuff being processed to introduce additional heat by means of the fluid in the fluid channel in the tool to stimulate reactions in the foodstuff being processed. Hence, the fluid channel location in the tool enables an accurate control of the temperature of the upper surface of the tool. In this way it is possible to control the temperature of a specific tool area, i.e. the upper surface where temperature control has the strongest effect because of the relatively large contact area between the foodstuffs and the upper surface of the tool. The fluid channel below the upper surface of the tool improves the quality of the foodstuff being processed.

A reference line often used in discussing an airfoil profile is the chord line, a straight line drawn through the profile connecting the extremities of the leading and trailing edges. The chord length is the length of the chordline from leading edge to trailing edge. The distance from this chord line to the upper and lower surfaces of the wing/airfoil profile denotes the magnitude of the upper and lower camber at any point. The term camber refers to the curvature of the upper surface and lower surface of a wing/airfoil profile. The upper surface and the lower surface of the tool have a non-symmetrical curvature to optimize the lift effect. In such a design a camber of the upper surface of the tool can be more pronounced than a camber of the lower surface, which can be relatively flat. Another reference line, drawn from the leading edge to the trailing edge, is the mean camber line. This mean line is equidistant at all points from the upper and lower surfaces. In an optimal airfoil design of the tool the mean camber line is located above the chord line. In addition, the maximum thickness of the airfoil profile is preferably located closer to the leading edge than the trailing edge. Further, the upper surface of the tool can also be identified as the outer surface of the tool seen from the rotation axis of the rotary shaft and the lower surface as the inner surface of the tool, because the upper surface of the tool is located further from the rotation axis as the lower surface.

The length of the tool is at least 50% of the length of the rotary shaft. The length of the tool extends mainly in the longitudinal (length) direction of the shaft.

The rotary shaft may comprise a single central shaft member (central shaft part) or two opposing shaft elements having the same rotation axis and having a distance between them. The at least one tool may extend between two opposing ends of the two shaft elements over the distance between the opposing shaft elements, i.e. the rotary shaft may be at least partly constructed without a physical center shaft element seen in the longitudinal direction of the rotary shaft. The rotary shaft may comprise more than one tool, wherein the tools are connected to the single central shaft member or to each other by at least one spacer, preferably by a number of spacers.

Advantageously the rotary shaft is manufactured in one-piece, i.e. the central shaft part, the at least one spacer and the at least one tool are produced in one-piece, preferably by using electrical discharge machining.

It is also an object of the present invention to provide an industrial device designed for an improved and more energy efficient processing foodstuffs, in particular mixing, kneading and/or conching foodstuffs. This object is achieved with the industrial device comprising at least one container having the above described rotary shaft.

BRIEF DESCRIPTION OF THE DRAWINGS

The invention will now be explained in more detail with reference to the drawings by means of a description of exemplary embodiments of a rotary shaft and an exemplary embodiment of an industrial device for processing foodstuffs, wherein:

FIGS. 1a,b show a perspective view of an industrial device for processing foodstuffs and respectively a perspective view of two rotary shafts used in the industrial device shown in FIG. 1a;

FIGS. 4a-d show various views of a first embodiment of a rotary shaft;

FIGS. 6a-c show various views of a third embodiment of a rotary shaft;

FIGS. 7a-c show various views of a rotary shaft provided with fluid channels and with a tool extending parallel to the longitudinal direction of the rotary shaft;

DETAILED DESCRIPTION

Figure 2A:
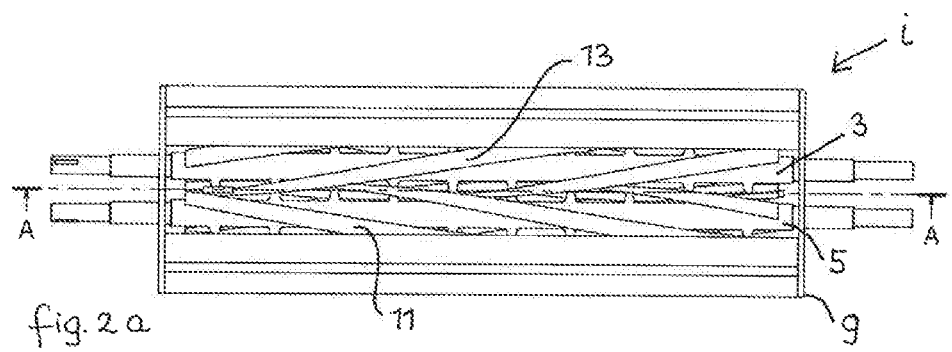
FIGS. 2a-e are various views of the industrial device for processing foodstuffs as shown in FIG. 1.
Figure 2B:
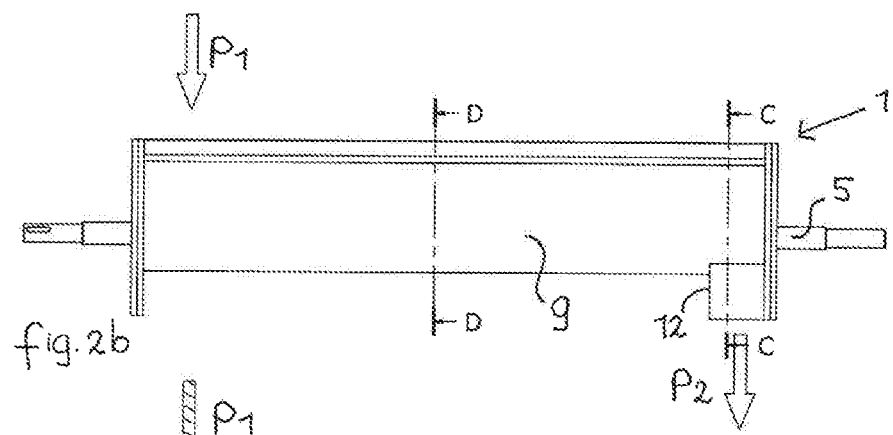
Figure 2C:
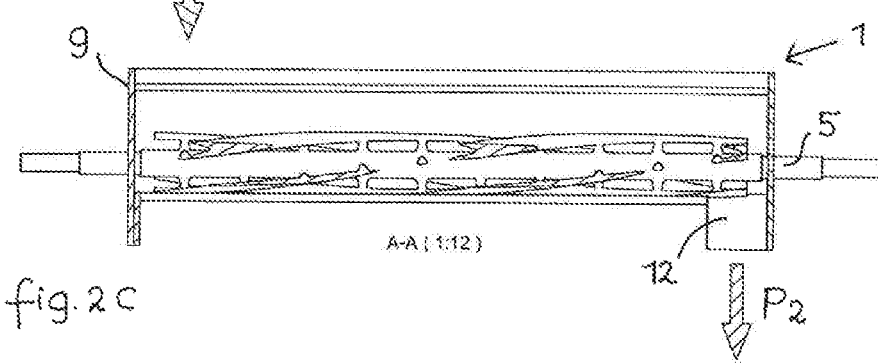
Figure 2D:
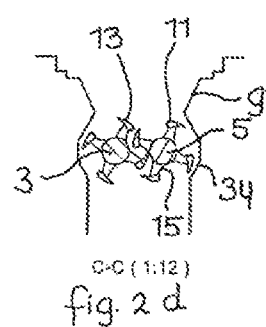
Figure 2E:
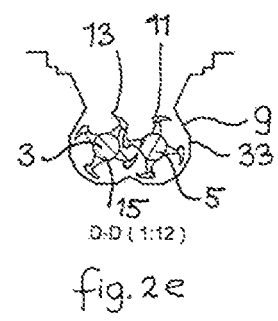
Figure 3A:
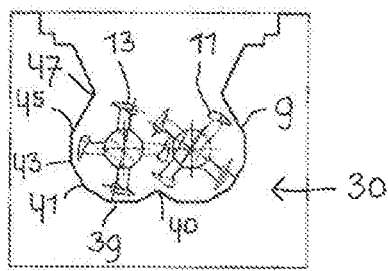
FIGS. 3a-d are sections of the industrial device as shown in FIG. 2e, wherein the counter-rotating rotary shafts are shown in various positions to each other.
Figure 3B:
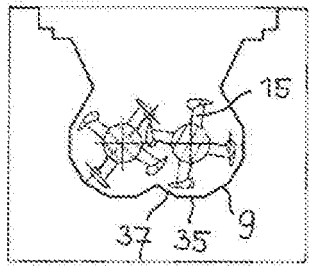
Figure 3C:
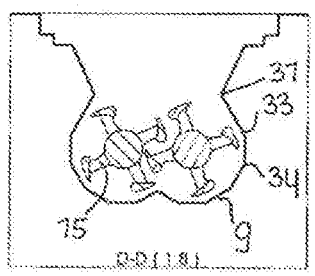
Figure 3D:
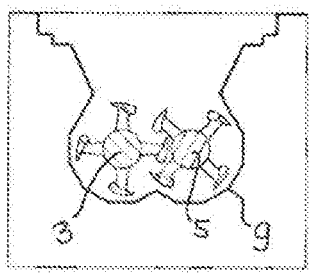

In the following description identical or corresponding parts have identical or corresponding reference numerals.

FIG. 1a shows in perspective view an industrial device 1 by means of which food products, such as foodstuffs in particular dough-like products such as bread dough or pastry or chocolate can be mixed and/or kneaded and/or conched. The industrial device 1 comprises a container having a container wall 9. The structure of such an industrial device 1 is known per se to the skilled person, for example from WO2006135229, and consequently only a compact description will be given herein. FIG. 1b shows in perspective view two counter-rotating rotary shafts 23, 25 which extend in the longitudinal direction of the container.

Each of the two counter-rotating rotary shafts 23, 25 disposed inside the container comprises a central shaft part 3, 5 and tools 11, 13 for mixing, conching and/or kneading foodstuffs, as will be explained in more detail hereafter. The two counter-rotating rotary shafts 23, 25 can be rotatably driven via driving means (not shown) in a manner which is known per se. The device 1 comprises a container inlet at an upstream location and indicated by arrow P1, via which the products to be processed can be introduced into the interior of the container. Downstream thereof, the container is provided with a container outlet 12, via which the processed product as indicated by arrow P2 leaves the device 1 again.

The inlet of the container is located closer to a first end 17, 17' of the rotary shaft 23, 25 than to a second end 19, 19' of the rotary shaft 23, 25 and the outlet 12 is located closer to the second end 19, 19' of the rotary shaft 23, 25 than to the first end 17, 17' of the rotary shaft 23, 25. The distance between the inlet and the outlet 12 is at least 50 cm, preferably at least 1 meter. Hence, in the container the foodstuff main transport direction extends parallel to the rotary shafts 23, 25.

In use the rotary shafts 23, 25 counter-rotate in the directions indicated by P3 and P4. Mounted on each central shaft part 3, 5 of the rotary shafts 23, 25 are four tools 11, 13. Each tool 11, 111 is a wing having an airfoil profile having a trailing edge and a leading edge. The two counter-rotating rotary shafts are identical, wherein the rotary shafts rotate in a direction such that the leading edge is the front edge and the trailing edge is the back edge. The tools 11, 13 are connected to the central shaft parts 3, 5 by bar-like spacers 15 and the tools 11, 13 helically surround the central shaft parts 3, 5. The spacers 15 extend transversely to the longitudinal direction of the central shaft parts 3, 5. The function of the helical configuration of the tools 11, 13 along the central shaft parts 3, 5 is to transport the foodstuff horizontally between the inlet and the outlet 12.

The operative space of the container, i.e. the area where the product is being processed is formed by a circumferential wall 9 of the container around the tools of the rotary shafts 23, 25 and end plates 8, 10 of the container. The end plates 8, 10 comprise through-holes 14, 16 through which the ends of the central shaft parts 3, 5 extend.

FIGS. 2a-e and 3a-d show the device 1 of FIG. 1 in various views. FIGS. 2d, 2e and 3a-d show sectional views of the device 1 along the lines C-C and D-D in FIG. 2b. In the container of the industrial device 1, the identical rotary shafts are rotated with respect to each other such that the tools 11, 13 of the two rotary shafts 23, 25 are able to rotate freely in overlapping virtual rotating circles.

The container comprises irregularities in the inner container wall 9, the irregularities of the container shown are corners 31, 33, 34, 35, 37, 39, 40, 41, 43, 45, 47 in the lower part 30 of the container wall 9. These corners are located near the two overlapping virtual rotating circles. In use the foodstuffs processed by means of the rotary shafts 23, 25 experience periodically more friction by means of the corners in the container wall to prevent foodstuffs sticking to the inner container wall such that the kneading and/or conching quality can be enhanced. As can be seen in the FIGS. 2d, 2e and 3a-d, the spacer 15 is a bar-like element which is connected to a part of the lower surface 18 (FIGS. 4c,d and 5c,d) of the tool closer to a leading edge 22, 122 than to a trailing edge 24, 124. The spacers 15 are somewhat tapered, because the spacers have a larger cross-section near the central shaft part 3, 5 than near the tool 11, 13. The spacers 15 have been regularly spaced with respect to each other over the surface of the central shaft part 5 in the circumferential direction and the longitudinal direction in helix configurations to support the tools helically surrounding the central shaft part.

The central shaft part 3, 5, the spacers 15 and the tools of a single rotary shaft 23, 25 are produced in one-piece, preferably by using electrical discharge machining.

FIGS. 4a-d show the rotary shaft 25 also shown in FIGS. 1-3. The device 1 comprising this rotary shaft 25 is configured for continuously processing foodstuffs from the inlet to the outlet 12 of the container. The helically configuration of the tool 11 provides a horizontal transport function in the container between the inlet and the outlet.

FIGS. 5*a-d* show another embodiment of a rotary shaft 125. In this embodiment of the rotary shaft 125, the tool 111 extends parallel to the longitudinal direction of the rotary shaft 125 and the spacers 115 have been regularly spaced with respect to each other in the circumferential direction and the longitudinal direction in a straight-line configuration over the surface of the cylindrical central shaft part 105. This embodiment of the rotary shaft 125 can be used in an industrial device (not shown) wherein the foodstuffs being processed are mainly vertically displaced through the container (not shown), i.e. the rotary shaft 125 comprising the tools 111 extending parallel to the center of the rotary shaft has almost no horizontal transport function. In such a container the inlet and the outlet at least partly overlap each other or the inlet and the outlet are concentric. In such an industrial device the foodstuffs will vertically displace through the container between the inlet and the outlet under the influence of gravity.

FIGS. 6*a-c* show another embodiment of a rotary shaft 223. In this embodiment of the rotary shaft 223, the tool 213 helically extends along a virtual center 70 of the rotary shaft 223 in a manner similar to the tools 11, 13 of the rotary shaft 23, 25 shown in FIGS. 1-4*d*. With respect to the rotary shaft 23, 25, the rotary shaft 223 does not have a central shaft part. The rotary shaft 223 comprises two opposing shaft elements 290, 292 rotating about the same rotation axis and having a distance there between. The four tools 213 extend between two opposing ends 280, 282 of two shaft elements 290, 292 over the distance between the two opposing shaft elements 290, 292. These opposing shaft elements 290, 292 comprise couplings 294, 296 for coupling the rotary shaft with for example a driving unit (not shown) and a bearing unit (not shown). The four tools 213 are connected to each other by a number of X-shaped spacers 225. The rotary shaft 125 can be used in an industrial device 1. It is also possible that the spacers for connecting the tools 213 have a different shape. The rotary shaft 223 increases advantageously the volume available for mixing, kneading and/or conching foodstuffs in a container of the industrial device 1, because the rotary shaft 223 has no central shaft part in the operative space of the container, i.e. the rotary shaft 223 occupies less volume in the container and has a relatively low weight.

Figure 4C:
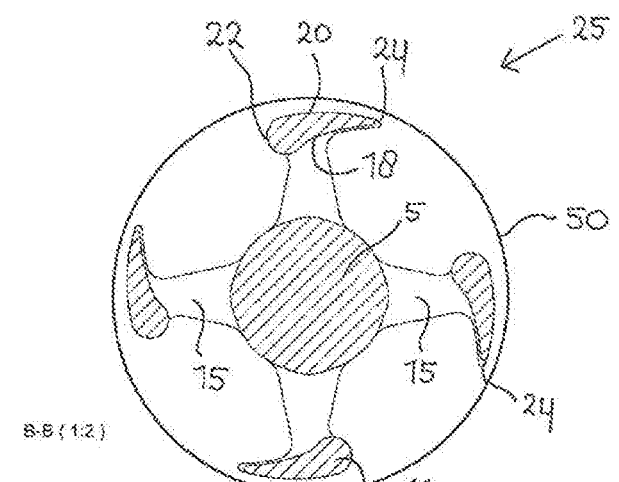
Figure 4D:
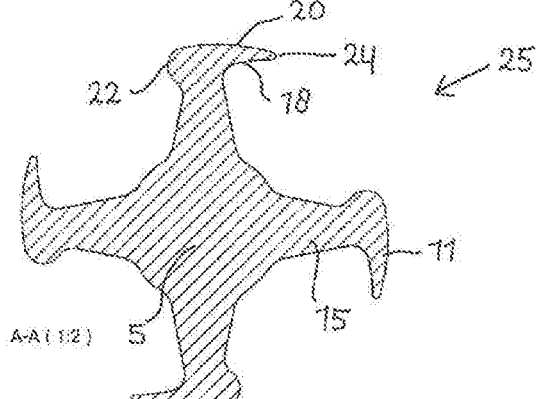
Figure 5A:
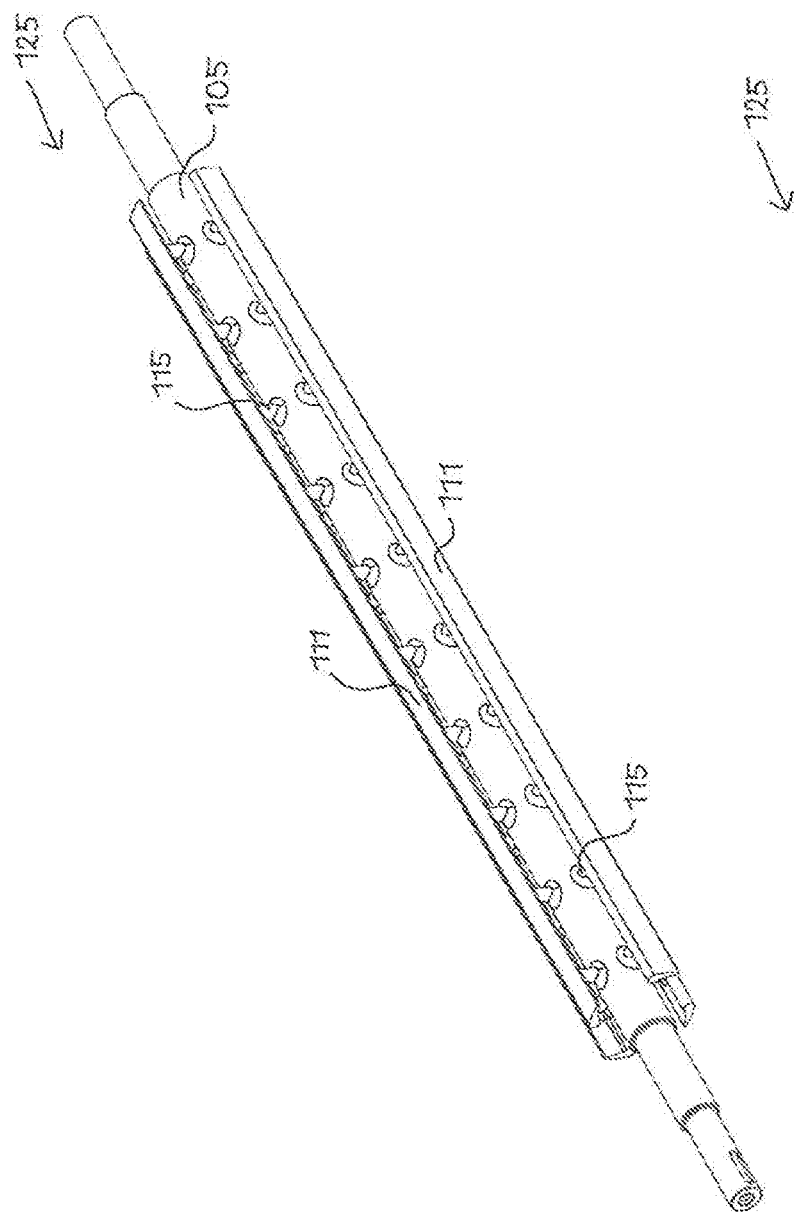
FIGS. 5a-d show various views of a second embodiment of a rotary shaft.
Figure 5B:
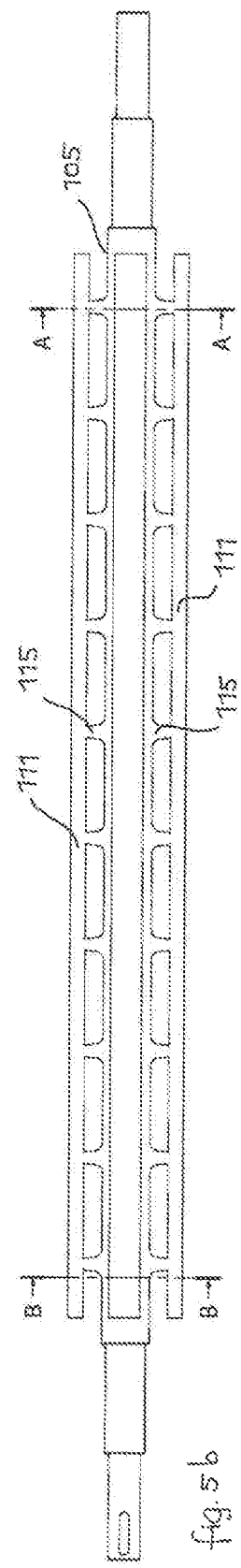
Figure 5C:
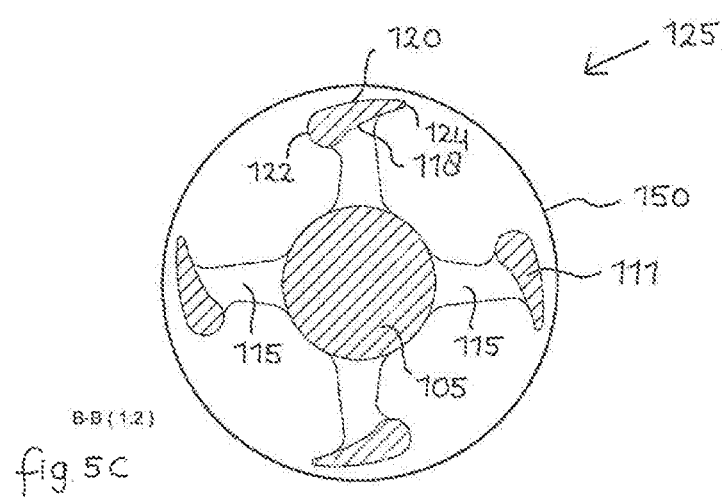
Figure 5D:
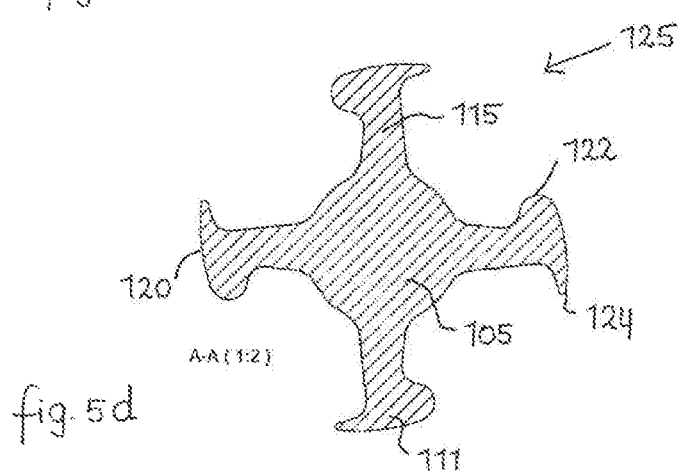

FIGS. 4*c, d*, 5*c, d* and 6*b* show sectional views of the rotary shafts 25; 125; 223 along the lines B-B and A-A in FIGS. 4*b*, 5*b* and 6*b*. These sectional views show that the tools 11, 111, 213 are wings having an airfoil profile such that the tool comprises a leading edge 22, 122, 222 a trailing edge 24, 124, 224, an upper surface 20, 120, 220 and a lower surface 18, 118, 220. In the rotary shaft 25, 125, 223 the leading edge 22, 122, 222 and the trailing edge are different, i.e. the leading edge is shaped differently than the trailing edge 24, 124, 224.

The upper surface 20, 120, 220 and the lower surface 18, 118, 218 of the tool 11, 111, 213 have a nonsymmetrical curvature to optimize the lift effect such that in use in the container of the industrial device 1 the dough or chocolate can be subjected to more shear stress between each tool 11, 111, 213 and the container wall 9, as a result of which the dough will be better kneaded and chocolate will be better conched in particular in the pasty phase. Such relatively high shear stress requires normally much power required to turn the shafts, which power consumption is drastically decreased with the rotary shaft, in particular with the wing-shaped tool. Without wishing to be bound to any particular theory, it is believed that the airfoil design of the tool 11, 111, 213 achieves in an energy efficient manner a beneficial lift effect on the foodstuff to be processed which in use provides the relatively high shear stress between the upper surface 20, 120, 220 of the tool 11, 111, 213 and the container wall 9, wherein the trailing edge 24, 124, 224 optimizes the flow of the processed foodstuff such that power usage can be reduced. In addition, the wing or airfoil designed tool 11, 111, 213 facilitates to withstand the enormous forces exerted on the rotary shafts 25, 125, 223 such that wear or breakage of the rotary shafts 25, 125, 223 is minimized and maintenance intervals are relatively large.

The camber of the upper surface 20, 120, 220 of the tool 11, 111, 213 can be more pronounced than a camber 18, 118, 218 of the lower surface, which can be relatively flat. The tools 11, 111, 213 are shaped and/or orientated such that the distance between the upper surface 20, 120, 220 and a virtual cylinder 50, 150, 250 varies. The virtual cylinder 50, 150, 250 has a center coincident with the rotation axis 70 of the rotary shaft 25, 125 and the radius of the virtual cylinder 50, 150, 250 is larger than the maximum distance between the rotation axis 70 of the rotary shaft 25, 125, 223 and the upper surface 20, 120, 220. The distance between the upper surface 20, 120, 220 and the virtual cylinder 50, 150, 250 is smaller near the trailing edge 24, 124, 224 than near the leading edge 22, 122, 222.

Another reference line, drawn from the leading edge to the trailing edge, is the mean camber line, which in the airfoil design of the tool 11, 111, 213 is located above the chord line. The maximum thickness of the airfoil profile is preferably 1.0-10.0 centimeter and the maximum thickness of the airfoil profile is located closer to the leading edge than the trailing edge. The leading edge 22, 122, 222 and the trailing edge 24, 124, 224 are round, wherein the radius of the leading edge 22, 122, 224 is larger than the radius of the trailing edge 24, 124, 224, i.e. the radius of the leading edge 22, 122, 224 is preferably 3-10 times larger than the radius of the trailing edge 24, 124. For example, the radius of the trailing edge 24, 124, 224 is approximately 2.5 mm and the radius of the leading edge 22, 122, 224 is approximately 12.5 mm.

The chord length is the length of the chordline from leading edge to trailing edge and is the characteristic dimension of an airfoil. The tool 11, 111, 213 has an airfoil profile having a chord length being at least the radius of the central shaft part 5, 105, wherein the radius of the central shaft part 5, 105 is preferably at least 4.0 cm.

Figure 8A:
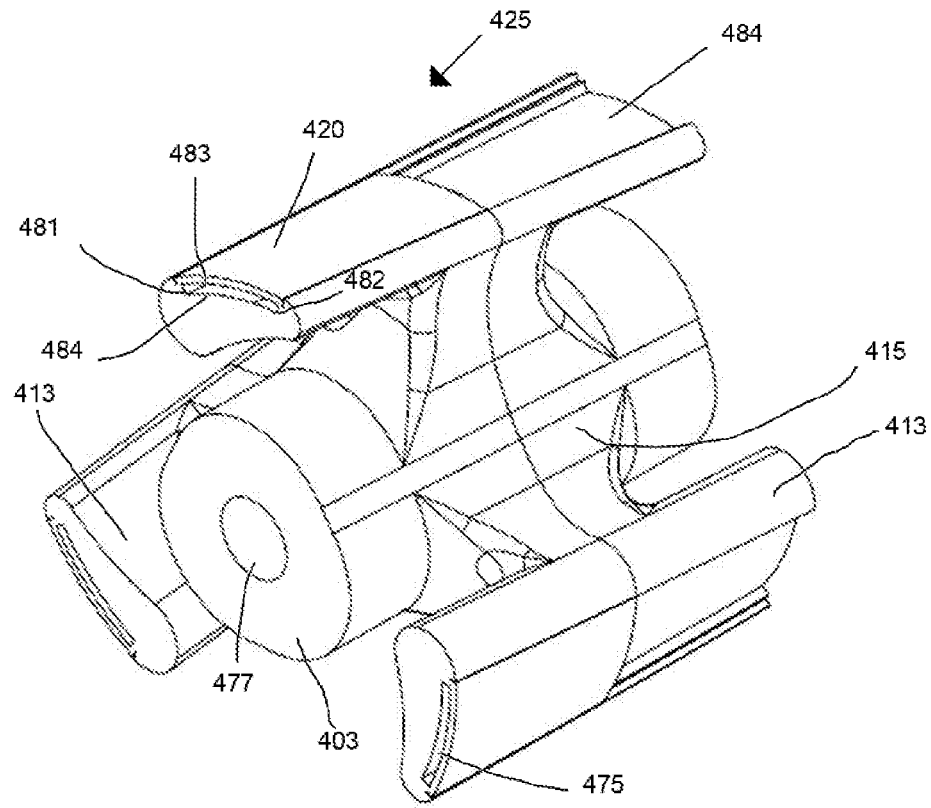
FIGS. 8a,b show various views of a rotary shaft provided with fluid channels and with a tool having a helical configuration with respect to the rotation axis.
Figure 8B:
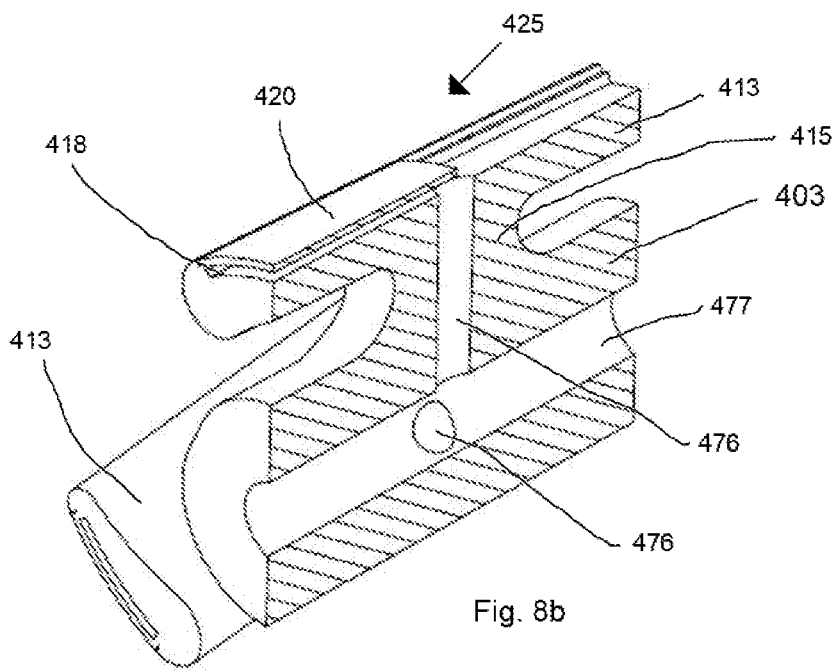

FIGS. 7*a-c* show various views of a portion of a rotary shaft 325 having parallel to the longitudinal direction of the rotary shaft extending tools 313. The central shaft 305, the spacers 315 and the tools 313 comprise fluid channels 375, 376, 377. FIGS. 8*a,b* show a portion of a rotary shaft 435 having tools 413 helically surrounding the rotation axis. The central shaft 405, the spacers 415 and the tool 413 also comprise fluid channels 475, 476, 477. The rotary shaft 435 shown in FIGS. 8*a,b* differs from the rotary shaft 425 shown in FIGS. 7*a-c* in that the tools 313 extend parallel to the rotation axis direction whereas the tools 413 helically surround the rotation axis.

The fluid channels shown in FIGS. 7*a-c* and 8*a,b* can also be applied in the rotary shafts shown in the FIGS. 1-6*c*, wherein in the rotary shaft 223 shown in FIGS. 6*a*-6*c* comprising the tools extending between two opposing ends of two shaft elements 290, 292 having the same rotation axis, each of the two shaft elements has at least a central fluid channel (not shown) directly connected to the fluid channel (not shown) in the tools 213. In the rotary shaft 223 being at least partly constructed without a physical center shaft element seen in the longitudinal direction of the rotary shaft 223, it is possible that the spacers 215 have no fluid channel.

In the rotary shaft 325 the fluid channel 377 in the central shaft 305 has a number of sections 377a, 377b as shown in FIG. 7c. The fluid channel section 377a may have a larger diameter than the fluid channel section 377b to facilitate that a part of the fluid flow from section 377a to section 377b will be diverted to the fluid channels 376 in the spacers 315. The fluid channels 376 in the spacers 315 are in fluid connection with the fluid channels 375 in the tools 313.

Each tool 313 has an airfoil profile, i.e. has a leading edge 324, a trailing edge 322, a lower surface 318 and an upper surface 320. Further, each tool 313 comprises a fluid channel 375 extending in the length direction of the tool and the fluid channel is located between the virtual mean camber line 380 (FIG. 7a) of the airfoil profile and the upper surface 320 of the tool. The length direction of the tool 313 extends parallel to the rotation axis. By means of the fluid channel 375 located relatively close to the upper surface 320 of the tool it is possible to control the temperature of the tool, in particular the temperature of the upper surface 320 of the tool 313. Depending on the food and/or other circumstances, the fluid in the fluid channel 375 may have a low temperature for cooling the foodstuff being processed or the fluid may have a high temperature for heating the foodstuff being processed.

The rotary shaft 313 rotates in use counter clockwise in a container (not shown), wherein the foodstuffs will be subjected to relatively high shear stresses between an upper surface 320 of the tool and the container wall. These shear stresses may produce heat in the food stuff being processed, in particular in the foodstuff between the container wall and the upper surface 320 of the tool. The fluid channel in the tool is able to cool the upper surface of the tool and so also the foodstuff being processed, in particular at the upper surface 320 where the relatively high shear stresses (producing the heat) occur.

The above paragraphs describing the rotary shaft 325 shown in FIGS. 7a-c are also applicable for the rotary shaft 425 shown in FIGS. 8a,b. However, as a result of the helical configuration of the tool 413 the length direction of the tool 413 does not extend parallel to the rotation axis, but the tool 413 helically surrounding the rotation axis extends mainly in the longitudinal direction of the rotary shaft 425.

The rotary shafts 23, 25; 125; 223; 325; 425 achieve the desired shear forces for the foodstuff being processed, because the diameter of a virtual rotating circle of the tool is smaller than the length of the rotary shaft. Preferably the diameter of the virtual rotating circle of the tool is smaller than 50% of the length of the rotary shaft, more preferably the diameter of the virtual rotating circle of the tool is 5-25% of the length of the rotary shaft. Further, the chord line length of the airfoil profile of the tool is preferably smaller than the smallest distance between the rotation axis and the lower surface of the tool to extend the life time of the rotary shafts 23, 25; 125; 223; 325; 425 in use.

The fluid channel 375, 475 shown has at least two sidewalls 481, 482 (FIG. 8a), at least a top wall 483 (FIG. 8a), and at least a bottom wall 484. The top wall 483 is located closer to the upper surface 420 than the bottom wall 484. Further, the top wall 483 and/or the bottom wall 484 have a curvature corresponding to the camber of the upper surface 420 of the tool 413.

It is possible that the tool comprises a number of fluid channels (not shown) or a fluid channel with a different shape as shown in FIG. 7a-8b such as for example one or more cylindrical shaped fluid channels in the tool. Further, the fluid channel may comprise multiple fluid channel compartments located next to each other below the upper surface of the tool.

The fluid channel is located under at least 25% of the total surface of the upper surface 320; 420 of the airfoil profile of the tool 313; 413. Preferably the at least one fluid channel is located under more than 35% of the total surface of the upper surface 320; 420 of the airfoil profile of the tool 313; 413, more preferably under more than 50% of the total surface of the upper surface 320; 420 of the airfoil profile of the tool 313; 413.

In the embodiments shown each tool 11, 111, 213, 313, 413 extends along the virtual rotation axis of the rotary shaft, i.e. the shown tools extend over more than $\frac{2}{3}$ of the length of the rotary shaft. The tools minimally extend over more than 50% of the length of the rotary shaft.

It is possible that at least one tool (not shown) has different airfoil profiles in the longitudinal direction of the rotary shaft to provide different foodstuff processing zones in the longitudinal direction of the shaft. In this way it is possible to adapt the tool to changes in the foodstuff being processes to provide an optimal mixing, kneading and/or conching operation in each zone.

Further, it is possible that each tool (not shown) is connected to the central shaft by means of a single spacer. A tool (not shown) may comprise a number of tool parts on the central shaft part, wherein the tool parts are spaced in the longitudinal direction of the rotary shaft an/or overlap each other in the longitudinal direction of the rotary shaft. Each tool part only covers a minimal length of the rotary shaft, for example each tool part only covers 20% of the length of the rotary. Again, the tool as a whole, i.e. all the tool parts of a single tool, extends over at least 50% of the length of the rotary shaft. The longitudinally over the length of the rotary shaft spaced tools may have a helical pattern, such as the longitudinally and helically extending tools 11, 13, 213 or may have the straight line pattern such as the longitudinally extending tools 111.

It is also possible that the rotary shaft (not shown) comprises at least one tool having an airfoil profile and at least one tool having another profile. In addition, it is possible that the rotary shaft (not shown) comprises tools having different airfoil profiles.

The at least one tool may comprise more than two spacers which are spaced from each other in the longitudinal direction of the rotary shaft, wherein seen in the longitudinal direction of the rotary shaft at least the first spacer includes a fluid supply channel and at least the last spacer seen in the longitudinal direction of the rotary shaft includes a fluid discharge channel, wherein the fluid supply channel and the fluid discharge channel are in fluid connection with the fluid channel in the tool. However, it is also possible that all or almost all the spacers of the tool contain a fluid channel, wherein the fluid channels of the spacers are in fluid connection with the fluid channel in the tool.

The skilled person will appreciate that in the foregoing the invention has been described on the basis of a few possible embodiments, which are preferred. The invention is not limited to these embodiments, however. Many possible equivalent modifications are conceivable within the framework of the invention, which modifications may fall within the scope of the appended claims. Further, the claims can also be combined with the features disclosed in the following clauses.

CLAUSES

1. Rotary shaft for processing foodstuffs, the rotary shaft has a rotation axis and the rotary shaft comprises at least one tool which extends along the rotation axis, wherein the tool has an airfoil profile such that the tool comprises a leading edge, a trailing edge, an upper surface and a lower surface, wherein the leading edge and the trailing edge are different.

2. Rotary shaft according to claim 1, wherein the upper surface and the lower surface have an asymmetric curvature.

3. Rotary shaft according to claim 1 or 2, wherein a camber of the upper surface of the tool is more pronounced than a camber of the lower surface, which is relatively flat.

4. Rotary shaft according to any of the preceding claims, wherein the leading edge and the trailing edge are round, wherein the radius of the leading edge is larger than the radius of the trailing edge, preferably the radius of the leading edge is 3-10 times larger than the radius of the trailing edge.

5. Rotary shaft according to any of the preceding claims 1-3, wherein the leading edge is round, and the trailing edge is sharp.

6. Rotary shaft according to any of the preceding claims, wherein the airfoil profile of the tool has a mean camber line located above the chord line.

7. Rotary shaft according to any of the preceding claims, wherein the at least one tool is a wing, preferably the wing has different airfoil profiles in the direction of the rotation axis of the rotary shaft to provide different foodstuff processing zones in the longitudinal direction of the shaft.

8. Rotary shaft according to any of the preceding claims, wherein the at least one tool helically surrounds the rotation axis.

9. Rotary shaft according to any of the preceding claims, wherein the maximum thickness of the airfoil profile is located closer to the leading edge than the trailing edge.

10. Rotary shaft according to any of the preceding claims, wherein the airfoil profile of the tool has a chord length being at least ⅓ of the minimal distance between the rotation axis and the tool.

11. Rotary shaft according to any of the preceding claims, wherein the at least one tool extends over at least 50% of the length of the rotary shaft.

12. Rotary shaft according to any of the preceding claims, wherein the at least one tool extends between two opposing ends of two shaft elements.

13. Rotary shaft according to claim 12, wherein the rotary shaft comprises at least two tools which are connected to each other by at least one spacer, preferably by a number of spacers.

14. Rotary shaft according to any of the preceding claims 1-11, wherein the rotary shaft comprises a central shaft part, wherein the at least one tool at least partly extends along the central shaft part and the at least one tool is connected to the central shaft part by at least one spacer.

15. Rotary shaft according to claim 14, wherein a shortest distance between the center of the central shaft part and the at least one tool is between 1.5-5.0 times the radius of the central shaft part.

16. Rotary shaft according to any of the preceding claims 13-15, wherein the at least one spacer is connected to the lower surface of the at least one tool, preferably the spacer is a bar-like element which is connected to a part of the lower surface, preferably this part is located closer to the leading edge than to the trailing edge.

17. Rotary shaft according to any of the preceding claims 13-16, wherein the at least one spacer transversely extends to the rotation axis.

18. Rotary shaft according to any of the preceding claims 14-17, wherein the at least one tool is connected to the central shaft part by a number of spacers.

19. Rotary shaft according to any of the preceding claims 14-18, wherein the rotary shaft comprises at least two tools spaced apart on the circumference of the central shaft part, preferably at least four tools.

20. Rotary shaft according to any of the preceding claims 14-19, wherein the at least one tool comprises a number of tool parts on the central shaft part, wherein the tool parts are spaced in the longitudinal direction of the rotary shaft, preferably the tool extends over at least 50% of the length of the shaft.

21. Rotary shaft according to any of the preceding claims 14-20, wherein the central shaft part, the at least one spacer and the at least one tool are produced in one-piece.

22. Industrial device for processing foodstuffs, wherein the device comprises at least one container having at least one rotary shaft according to any of the preceding claims.

23. Industrial device according to claim 22, wherein in the container the main foodstuff transport direction extends parallel to the rotary shaft, wherein the container comprises an inlet located closer to a first end of the rotary shaft than to a second end of the rotary shaft, through which inlet the foodstuffs to be processed in the container can be introduced into the container, as well as an outlet located closer to the second end of the rotary shaft than to the first end of the rotary shaft, through which outlet the processed foodstuffs can be discharged.

24. Industrial device according to claim 22, wherein the container comprises an inlet for introducing the foodstuffs to be processed into the container, as well as an outlet for discharging the processed foodstuffs, wherein the inlet and the outlet at least partly overlap each other.

25. Industrial device for processing foodstuffs, wherein the device comprises a container having at least two counter-rotating rotary shafts according to any of the preceding claims 1-21.

26. Industrial device according to claim 25, wherein the tools of the rotary shafts rotate freely in overlapping virtual rotating circles, preferably the at least two counter-rotating rotary shafts are identical.

27. Industrial device according to any of the preceding claims 22-26, wherein the device is configured for continuously processing foodstuffs.

28. Industrial device according to any of the preceding claims 22-27, wherein the at least one tool is shaped and/or orientated such that the distance between the upper surface and a virtual cylinder having a center coincident with the rotation axis of the rotary shaft varies, preferably the radius of the virtual cylinder is larger than the maximum distance between the rotation axis of the rotary shaft and the upper surface and preferably the distance between the upper surface and the virtual cylinder is smaller near the trailing edge than near the leading edge.

29. Industrial device according to any of the preceding claims 22-28, wherein the container contains irregularities in the inner container wall, for example corners.

30. Method for manufacturing a rotary shaft according to any preceding claims 1-21 using electrical discharge machining.

31. Method according to claim 30, wherein the rotary shaft comprises a central shaft part and at least one spacer for connecting the tool to the central shaft part, wherein the central shaft part, the at least one spacer and the at least one tool are produced in one-piece.

32. Method for processing foodstuffs using an industrial device according to any of the preceding claims 22-29.

The invention claimed is:

1. A rotary shaft for processing foodstuffs, the rotary shaft having a rotation axis and the rotary shaft comprising at least one tool which extends along the rotation axis, wherein the tool has an airfoil profile such that the tool comprises a leading edge, a trailing edge, an upper surface and a lower surface, wherein the tool comprises at least one fluid channel extending in a length direction of the tool and located between a mean camber line of the airfoil profile and the upper surface of the tool, and wherein at least one spacer is connected to the lower surface of the at least one tool.

2. The rotary shaft according to claim 1, wherein the mean camber line of the airfoil profile of the tool is located above a chord line of the airfoil profile of the tool.

3. The rotary shaft according to claim 1, wherein the at least one tool is a wing having different airfoil profiles in the longitudinal direction of the shaft to provide different foodstuff processing zones in the longitudinal direction of the shaft.

4. The rotary shaft according to claim 1, wherein the leading edge and the trailing edge are round, and wherein the radius of the leading edge is 3-10 times larger than the radius of the trailing edge.

5. The rotary shaft according to claim 1, wherein the at least one spacer is a bar-like element.

6. The rotary shaft according to claim 5, wherein the at least one spacer is connected to a part of the lower surface of the tool, wherein the part is located closer to the leading edge than to the trailing edge.

7. The rotary shaft according to claim 1, wherein the at least one tool comprises more than two spacers which are spaced from each other in the longitudinal direction of the rotary shaft, wherein seen in the longitudinal direction of the rotary shaft at least the first spacer includes a fluid supply channel and at least the last spacer seen in the longitudinal direction of the rotary shaft includes a fluid discharge channel, wherein the fluid supply channel and the fluid discharge channel are in fluid connection with the fluid channel in the tool.

8. The rotary shaft according to claim 1, wherein the diameter of a virtual rotating circle of the tool is smaller than 50% of the length of the rotary shaft.

9. The rotary shaft according to claim 1, wherein the rotary shaft is produced in one-piece.

10. The rotary shaft according to claim 1, wherein the at least one tool helically surrounds the rotation axis.

11. The rotary shaft according to claim 1, wherein a chord line length of the airfoil profile of the tool is smaller than the smallest distance between the rotation axis and the lower surface of the tool.

12. The rotary shaft according to claim 1, wherein the rotary shaft comprises a central shaft part, wherein the at least one tool at least partly extends along the central shaft part and the at least one tool is connected to the central shaft part by at least one spacer, wherein the at least one tool comprises a number of tool parts on the central shaft part, wherein the tool parts are spaced from each other in the longitudinal direction of the rotary shaft, wherein the central shaft part comprises at least partially at least one fluid channel.

13. The rotary shaft according to claim 1, wherein the at least one tool extends between two opposing ends of two shaft elements having the same rotation axis, wherein the rotary shaft comprises at least two tools which are connected to each other by at least one spacer, wherein each of the two shaft elements has at least a central fluid channel directly connected to the fluid channel in the tool.

14. The rotary shaft according to claim 1, wherein the at least one fluid channel has at least two sidewalls, at least a top wall, and at least a bottom wall, wherein the top wall is located closer to the upper surface than the bottom wall and the top wall and/or the bottom wall have a curvature corresponding to a camber of the upper surface of the tool.

15. The rotary shaft according to claim 1, wherein a first portion of the at least one fluid channel, located closer to the leading edge than a second portion of the at least one fluid channel, is located further from the virtual mean camber line than the second portion.

16. The rotary shaft according to claim 1, wherein the at least one fluid channel comprises multiple fluid channel compartments located next to each other below the upper surface of the tool.

17. The rotary shaft according to claim 1, wherein the at least one tool of the rotary shaft is shaped and/or orientated such that the distance between the upper surface and a virtual cylinder is smaller near the trailing edge than near the leading edge, wherein the virtual cylinder has a centre coincident with the rotation axis of the rotary shaft and the radius of the virtual cylinder is larger than the maximum distance between the rotation axis of the rotary shaft and the upper surface of the tool.

18. An industrial device for processing foodstuffs, wherein the device comprises at least one container having at least one rotary shaft for processing foodstuffs, the rotary shaft having a rotation axis and comprising at least one tool that extends along the rotation axis, wherein the tool has an airfoil profile such that the tool comprises a leading edge, a trailing edge, an upper surface and a lower surface, wherein the tool comprises at least one fluid channel extending in a length direction of the tool and located between a mean camber line of the airfoil profile and the upper surface of the tool, and wherein at least one spacer is connected to each of the lower surface of the at least one tool and the rotary shaft.

19. The industrial device according to claim 18, wherein in the container a main foodstuff transport direction extends parallel to the rotary shaft, wherein the container comprises an inlet located closer to a first end of the rotary shaft than to a second end of the rotary shaft, through which inlet the foodstuffs to be processed in the container can be introduced into the container, as well as an outlet located closer to the second end of the rotary shaft than to the first end of the rotary shaft, through which outlet the processed foodstuffs can be discharged.

20. The industrial device according to claim 18, comprising at least two rotary shafts, wherein the at least two rotary shafts counter-rotate, and wherein the device is configured for continuously processing foodstuffs.

* * * * *